United States Patent [19]

Sanchez

[11] Patent Number: 4,971,150
[45] Date of Patent: Nov. 20, 1990

[54] FOAM INJECTION INTO A GRAVITY OVERRIDE ZONE FOR IMPROVED HYDROCARBON PRODUCTION

[75] Inventor: J. Michael Sanchez, Dallas, Tex.

[73] Assignee: Mobil Oil Corporation, Fairfax, Va.

[21] Appl. No.: 419,997

[22] Filed: Oct. 11, 1989

[51] Int. Cl.$^5$ .................. E21B 33/138; E21B 43/24; E21B 43/30

[52] U.S. Cl. .................. 166/245; 166/263; 166/272; 166/294

[58] Field of Search ............... 166/245, 263, 272, 273, 166/274, 294

[56] References Cited

U.S. PATENT DOCUMENTS

| | | | |
|---|---|---|---|
| 4,086,964 | 5/1978 | Dilgren et al. | 166/272 |
| 4,166,504 | 9/1979 | Brown et al. | 166/263 X |
| 4,300,634 | 11/1981 | Clampitt | 166/272 |
| 4,445,573 | 5/1984 | McCaleb | 166/272 X |
| 4,470,462 | 9/1984 | Hutchison | 166/272 X |
| 4,577,688 | 3/1986 | Gassmann et al. | 166/263 X |
| 4,601,337 | 7/1986 | Lau et al. | 166/263 |
| 4,676,318 | 6/1987 | Myers et al. | 166/292 X |
| 4,694,906 | 9/1987 | Hutchins et al. | 166/294 |
| 4,703,797 | 11/1987 | Djabbarah | 166/252 |
| 4,782,901 | 11/1988 | Phelps et al. | 166/270 |

Primary Examiner—George A. Suchfield
Attorney, Agent, or Firm—Alexander J. McKillop; Charles J. Speciale; Charles A. Malone

[57] ABSTRACT

A process for increasing the production of hydrocarbonaceous fluids in a reservoir where foam is injected into a gravity override zone. Foam is injected into the override zone via a well placed in the zone. This foam injection wall is positioned between an injector and a producer well. During a steam-flooding or carbon-dioxide flooding, foam is injected into the override area via the foam injection wall thereby blocking the override area and causing flooding fluids to be directed into an oil rich overridden area. Foam utilized herein can be formed in-situ or ex-situ by a noncondensible gas and a surfactant.

11 Claims, 12 Drawing Sheets

FOAM INJECTION INTO A GRAVITY OVERRIDE ZONE FOR IMPROVED HYDROCARBON PRODUCTION

BACKGROUND OF THE INVENTION

This invention relates to a carbon dioxide or steam drive process for producing a viscous oil or tar. More particularly, the invention provides a process for recovering oil from a subterranean viscous oil reservoir, or at least a portion of such reservoir, in which the stratification due to differences in permeabilities of the individual areas of rocks is not sufficient to cause a significant portion of the injected gas to flow through only one or a few layers of exceptionally high permeability.

THE INVENTION

In the recovery of oil from oil-containing formations, it is usually possible to recover only minor portions of the original oil in-place by the so called primary recovery methods which utilize only the natural forces present in the formation. Thus, a variety of supplemental recovery techniques have been employed in order to increase the recovery of oil from subterranean formations. These techniques include thermal recovery methods, e.g., steam flooding, water flooding, carbon dioxide and miscible flooding.

In a viscous oil reservoir, the rocks may be capable of exhibiting high vertical and horizontal absolute permeability, although the mobility (i.e., permeability divided by viscosity) of fluid within the reservoir may be low and/or in-homogenous due to the presence of viscous oil within some or all of the pore spaces. In such a relatively non-stratified reservoir, fluids tend to become segregated by the density. When a stratification of mobility is encountered it is usually due to the distribution of the oil, for example, in a layer above the water-rich, or below a gas-rich, portion of the reservoir.

When carbon dioxide or steam is flowed through such a reservoir at a pressure less than the fracturing pressure, steam tends to form a finger or channel that overrides a significant portion of the reservoir due to gravity segregation. Such a channel usually rides or runs along the upper portion of the reservoir, due to the effects of gravity. However, where an oil-rich layer overrides a water-rich layer, the steam channel may run along the upper portion of the water layer, near its junction with the oil layer. As is known to those skilled in the art, in such reservoirs, a carbon dioxide or steam channel can be relatively quickly formed and extended between horizontally separated injection and production locations for example, by injecting steam at a pressure near or less than the fracturing pressure while producing fluids as rapidly as possible.

Dilgren et al. in U.S. Pat. No. 4,086,964, which issued May 2, 1978 taught a process for producing oil from at least a portion of a subterranean viscous oil reservoir. Steam was injected at the injection well and fluid was produced at the production well. These wells were horizontally spaced apart within a portion of the reservoir in which a steam flow path tends to rise or fall in response to the effects of gravity or oil distribution rather than remaining within the more permeable zones though the steam channel exceeded that required for steam alone but was less than the reservoir fracturing pressure. The composition of the steam-foam-forming mixture was correlated with the properties of the rocks and fluids in the reservoir so that the pressure required to inject the mixture and the foam it forms or comprises into and through the steam channel exceeded that required for steam alone though it was less than the reservoir fracturing pressure. Thereafter, the composition of the fluid being injected into the steam channel was maintained to the extent required to cause a flow of both steam and foam within the channel in response to a relatively high pressure gradient in which the oil-displacing and channel-expanding effects were significantly greater than those provided by steam alone, without plugging the channels. This patent is hereby incorporated by reference herein in its entirety.

It has now been determined that when foam is injected along with steam at the injection well that the surfactant solution forms a gravity tongue which underruns the reservoir during foam injection into the bottom of the zone. Thus, not all of the foam solution reaches the gravity override zone as was previously believed. If the foam did reach the gravity override zone its efficiency was greatly diminished because of the gravity tongue of surfactant that formed in the reservoir during steam/surfactant injection which caused a considerable amount of the foam solution or foam to be lost at a distance not too far from the injection well.

Therefore, what is needed is a method whereby vertical sweep efficiency will be increased when foam is injected directly into the gravity override zone which will result in far more gas flow diversion than injection of pre-formed foam into the bottom of the vertical cross-section of an injection well while maintaining the steam injection pressure and rate.

SUMMARY

This invention relates to a method for placing a foam composition directly into a gravity override zone during a carbon dioxide or steam flood so as to improve the vertical sweep efficiency while avoiding the creation of a gravity tongue of surfactant solution which underruns the formation. In the practice of this invention, steam injection is begun at an injection well. Preferably steam injection is continued until steam breakthrough occurs at a production well. Thereafter, a foam injection well is placed midway between a first injection well and a production well. While carbon dioxide or steam injection is directed into the formation at the original injection well, a foam, e.g. a surfactant and a non-condensible gas are injected at an appropriate rate into the foam injection well which is positioned near the top of the pay zone between injector and producer wells. This results in foam injection directly into the carbon dioxide or steam drive zone and into the override zone. By generating foam directly into and within the override zone, the foam contacts less oil since injection occurs in the upper carbon dioxide or steam swept zone. Additionally, the higher injection pressure associated with coinjecting carbon dioxide or steam and foam is avoided since foam is generated far from the injection well.

It is therefore an object of this invention to avoid forming a foam or surfactant solution gravity tongue which underruns the reservoir when foam injection is done at the injection well.

It is another object of this invention to increase the vertical sweep efficiency by using a pre-formed foam wherein said foam is injected directly into the gravity override zone.

It is yet another object of this invention to inject a pre-formed foam directly into the gravity override zone so as to obtain a greater gas flow diversion than can be accomplished by injecting a pre-formed foam into the bottom of a vertical injection well.

It is a still yet further object of this invention to improve surfactant or other foaming component utilization by injecting a pre-formed foam directly into the top of an overridden zone so as to avoid loss by gravity underrun.

It is a yet still further object of this invention to obtain increased yields of hydrocarbonaceous fluids by injecting foam into an injection well placed midway between an injection and a production well.

DESCRIPTION OF THE PREFERRED EMBODIMENT

Figure 1:
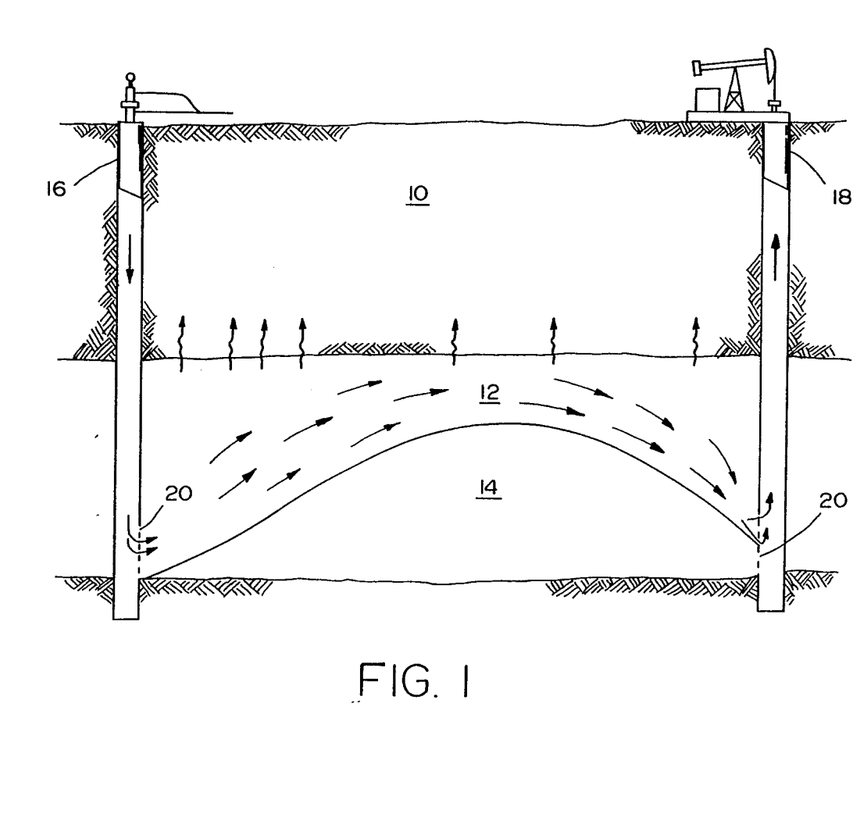
FIG. 1 depicts a gravity override situation during a steam injection within a reservoir.

A drive fluid override condition exists in a formation containing hydrocarbonaceous fluids as is shown in FIG. 1 when the drive fluid, e.g., steam or carbon dioxide, enters the injection well 16 and proceeds over an oil-containing portion of formation 14 into producer well 18. Due to the existence of this condition, much of the oil in override area 14 is left in the formation. Therefore, a method is needed whereby oil or hydrocarbonaceous fluids in overridden zone 14 can be removed from the formation. A discussion directed to a carbon dioxide override situation is discussed in U.S. Pat. No. 4,782,901 which issued to Phelps et al. on Nov. 8, 1988. This patent is hereby incorporated by reference herein in its entirety.

Figure 2:
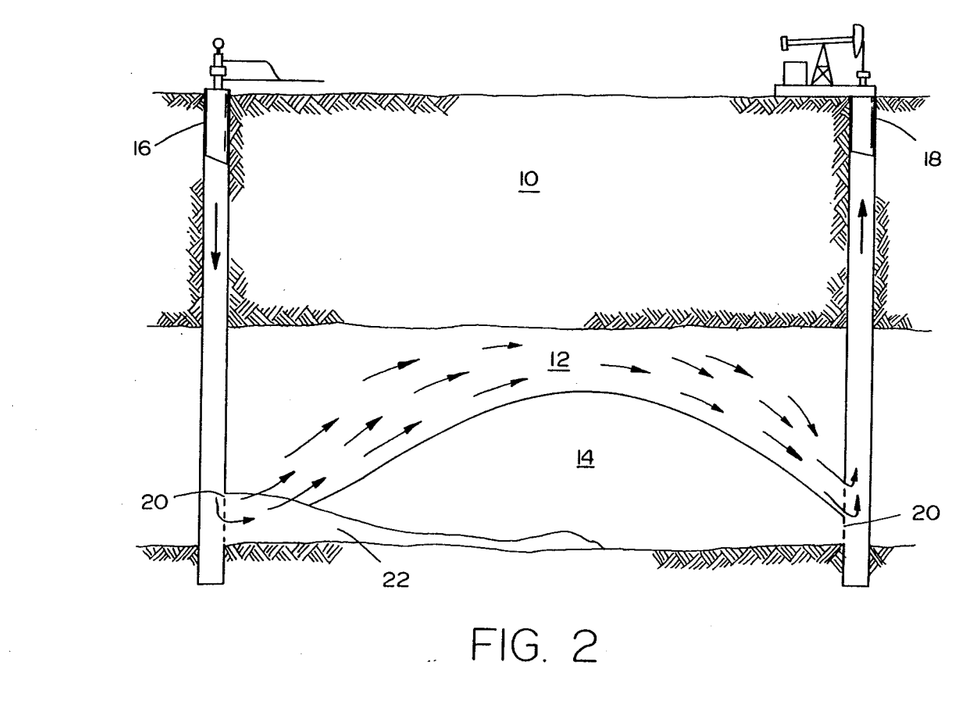
FIG. 2 is a schematic representation where steam and a preformed foam have been injected into an injection well thereby forming a solution gravity tongue underride.

In order to remove oil from overridden zone 14 Dilgren et al. in U.S. Pat. No. 4,086,964 which issued on May 2, 1978 injected foam into an injection well along with steam to redirect the steam through overridden zone 14 so as to recover hydrocarbonaceous fluids. This patent is hereby incorporated by reference herein. As is shown in FIG. 2, recent laboratory results and studies by S.M. Mahmood in a publication entitled *"Two-Dimensional Displacement of Oil By Gas and Surfactant Solution Under Forming Conditions"*, SUPRI TR-15, which was published July 1987, indicated the existence of the gravity tongue underrun. This gravity tongue underrun is depicted in FIG. 2. As depicted in FIG. 2, when steam and foam are injected into injection well 16 the foam has a tendency to form a gravity tongue underrun 22. By forming this gravity tongue underrun 22, the liquid surfactant solution has a tendency to settle on the bottom of the reservoir and enter into overridden zone 14. Thus, the steam continues to ride upwardly over overridden zone 14 into override zone 12 and exit the formation through perforations 20 via production well 18, thereby leaving behind hydrocarbonaceous fluids contained in overridden zone 14. Thus, this method prevents the formation of a gravity tongue underrun.

Figure 3:
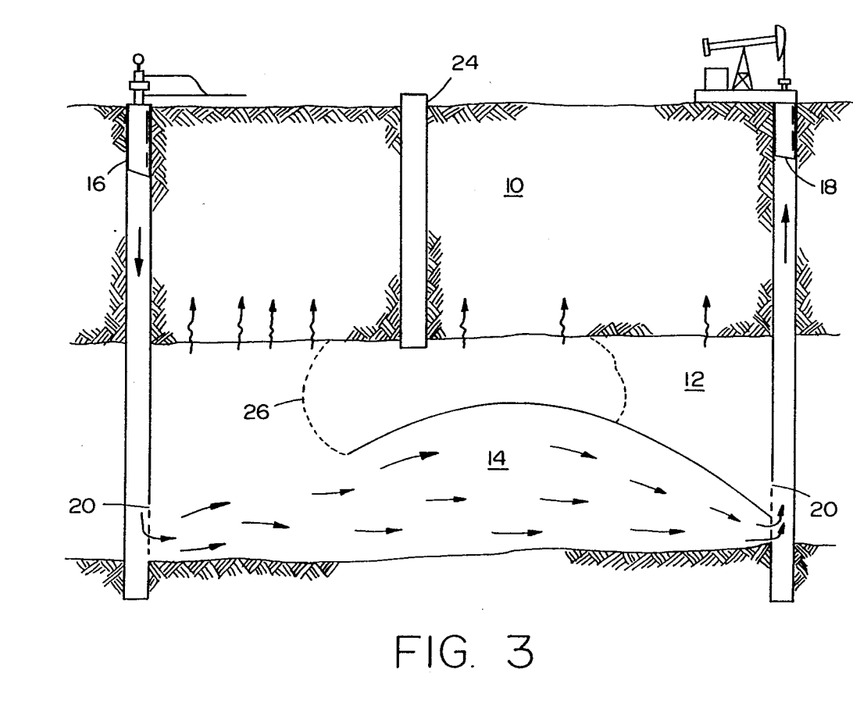
FIG. 3 is a schematic representation which depicts a centered injection well with a preformed foam having been injected into the override zone thereby blocking the override zone and diverting steam into a lower pay zone.

In the practice of this invention, as is shown in FIG. 3, a drive fluid is injected into the formation by injection well 16. The drive fluid exits injector well 16 by perforations 20 and enters the overridden zone 14 because of the existence of the foam in override zone 12. The foam was injected into override zone 12 by a second injector well 24. Injector well 24 penetrates pay zone cap 10 and enters the top of override zone 12. Foam is then injected into injector well 24 so as to cause a blocking effect in override zone 12. Once override zone 12 is blocked by the foam, drive fluid enters overridden zone 14 and exits producer well 18 by perforations 20 and thereafter are produced to the surface along with hydrocarbonaceous fluids. Drive fluids which can be utilized herein include steam and carbon dioxide.

Foamable compositions for treating the formation which can be utilized herein are disclosed in U.S. Pat. No. 4,300,634 which issued to Clampitt on Nov. 17, 1981. This patent is hereby incorporated herein in its entirety by reference. This patent taught use of a thermally stable foamable drill composition suitable for primary oil recovery, with e.g., steam- or gas-foamed systems. These systems comprise water, a surfactant, a polymeric viscosifier, an aldehyde component, and at least one phenolic component such as resorcinol, catechol and the like.

Hutchins et al. in U.S. Pat. No. 4,694,906 which issued on Sept. 22, 1987, taught a method for placement of a gelatinous foam into a gas flooding enhanced recovery operation. This patent is hereby incorporated by reference herein. To make the foamable composition an aqueous solution containing a cross-linkable water-soluble polymer was injected into a formation along with the material capable of at least partially cross-linking the polymer to form a gelatinous precipitate. Also included therein was a water-soluble aqueous material in an amount sufficient to maintain the pH of the aqueous solution above the pH at which cross-linking occurs until the composition has passed a desired distance through the reservoir. Included also was a water-soluble surface active agent and a gas mixture comprising an acid gas. The gelatinous foam formed in situ and is useful for blocking the escape of fluids, both gases and liquid, into a higher permeability zone of the reservoir during an enhanced oil recovery operation, typically one utilizing carbon dioxide flooding.

Myers et al. in U.S. Pat. No. 4,676,318 which issued on June 3, 1987 taught another method of making a foam. This method uses an alkali metal silicate foam to reduce the permeability of the subterranean formation. Yet another method of making a foam is disclosed by Djabbarah in U.S. Pat. No. 4,703,797 which issued on Nov. 3, 1987. These patents are hereby incorporated by reference herein. The method disclosed by Djabbarah was used to improve the sweep efficiency during an enhanced oil recovery operation. The foam was generated by the dispersion of the displacing fluid in an aqueous solution of a mixed surfactant system. The mixed surfactant system comprised a lignosulfonate foaming agent and a surfactant foaming agent.

In addition to forming a gravity underrun, the prior art method of Dilgren et al. also relied on the addition of the foam at the injection well in a manner which results in higher injection pressures, thereby causing the deleterious effect of lower injection rates. Utilizing a second foam injection well for the foam injection overcomes this problem. The second injection well is located between the steam injection well and the production well and as mentioned above it is drilled in a manner such that a surfactant solution and a non-condensible gas for example may be injected near the top of the pay zone. This surfactant injection procedure results in foam generation directly into the override, drive fluid swept zone. Additionally, the surfactant utilized will contact less oil since injection occurs in upper drive fluid swept zone, thus reducing the formation of an emulsion with the oil.

Figure 4:
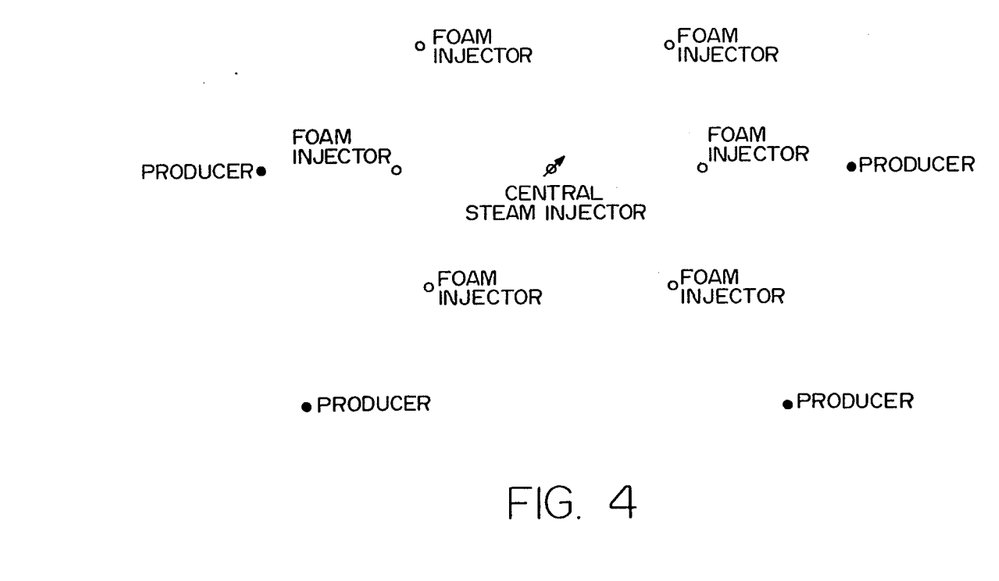
FIG. 4 is a topical view of a preferred embodiment of a steam injection process wherein a centrally located foam injection well is utilized and production is accomplished by a concentric well pattern.

Although any of the various well patterns which are utilized in the production of hydrocarbonaceous fluids from a formation can be used here, a concentric well pattern is preferred. This concentric well pattern is shown in FIG. 4. Here drive fluid injector well 16 is readily surrounded by foam injector wells 24. Foam injector wells 24 are surrounded by producer wells 18. This concentric well pattern is the preferred method for utilizing the invention herein. Utilizing this invention results in a vertical sweep efficiency improvement when pre-formed foam is injected directly into the gravity override zone as compared to pre-formed foam which is injected into the bottom of the reservoir along with the drive fluid such as steam.

Figure 5:
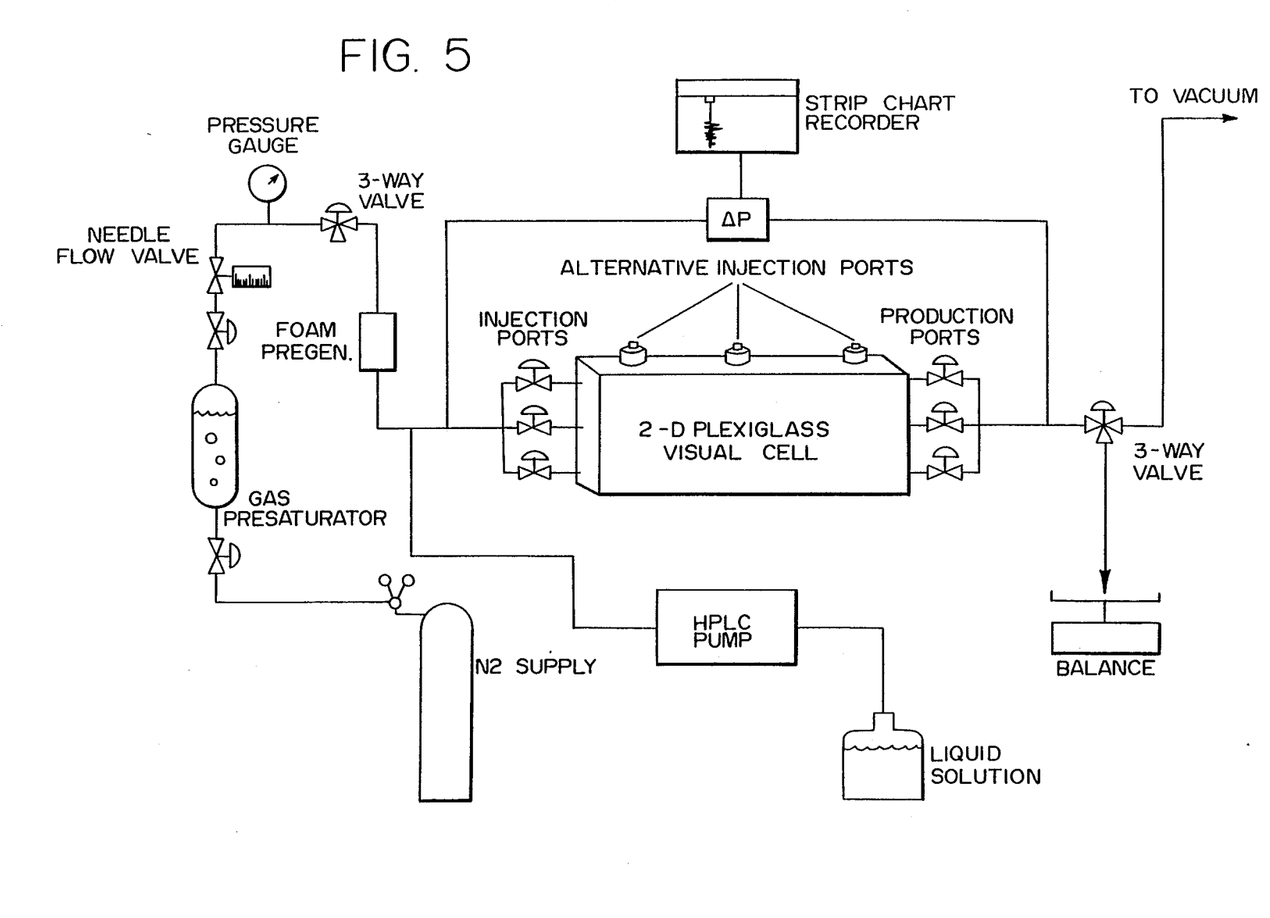
FIG. 5 is a schematic representation of a two-dimensional laboratory system which was used for testing the process concept.

To confirm the results of this novel method, data was generated in the lab to support the conclusions. FIG. 5 is a schematic representation of the apparatus and method which was used to substantiate the concept expressed in this invention. This apparatus and method conforms to one taught by Mahmood which was mentioned above. The apparatus consists of a two-dimensional vertical cross-section lab model which was constructed from plexiglass. Crushed cryolite was used as the porous media. The cryolite rock was selected to be of a sieve size between about 18–50 mesh API. Utilization of this mesh results in a rock having a permeability of about 380 Darcies. This high permeability was necessary to insure the dominance of the gravity during the experiments which were run. Four experimental cases were run. The results of these experimental cases are shown below.

EXPERIMENTAL CASE 1

Figure 6:
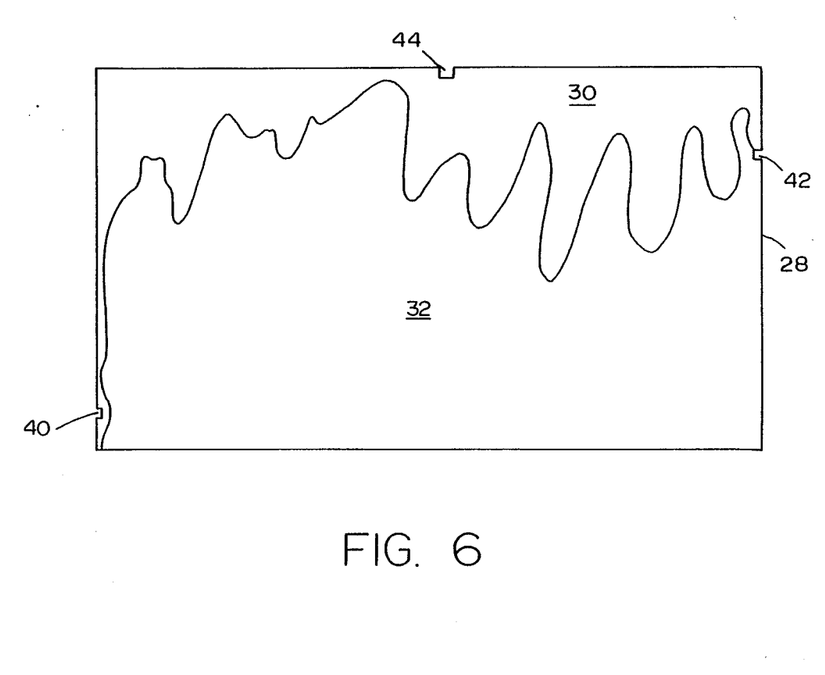
FIG. 6 is a representation of a two-dimensional (2-D) plexiglas cell the gravity override effect of injected nitrogen.
Figure 7:
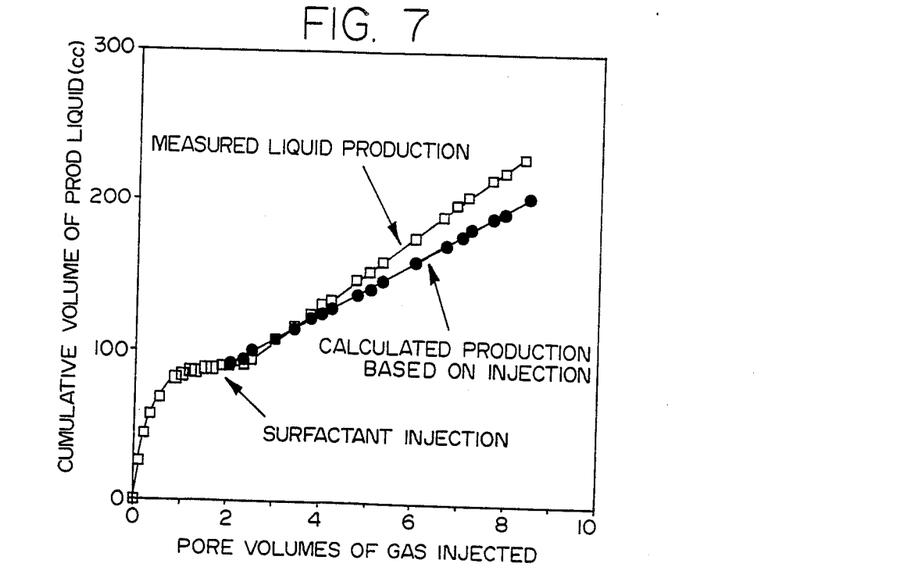
FIG. 7 illustrates graphically incremental liquid production resultant from surfactant/gas coinjection.

Gas and a surfactant solution were injected into the bottom injection port as shown in FIG. 5 of the two-dimensional plexiglas visual cell. The two-dimensional plexiglas cell is shown in FIG. 6. As is shown in FIG. 6, reservoir 28 contains a liquid in unswept zone 32. Nitrogen gas is injected into injection port 40 and overrides unswept zone 32 as it proceeds to production port 42. Due to the lighter specific gravity of nitrogen it proceeds along the top of the reservoir into the override zone 30. The result of the injection of the nitrogen gas is shown in FIG. 7. FIG. 7 shows the amount of liquid actually produced based upon the amount of gas injected into the two-dimensional plexiglas cell. As such, it represents the cumulative production history as actually obtained from the test and it also shows the steady state mass balance which was anticipated from the test.

Figure 8:
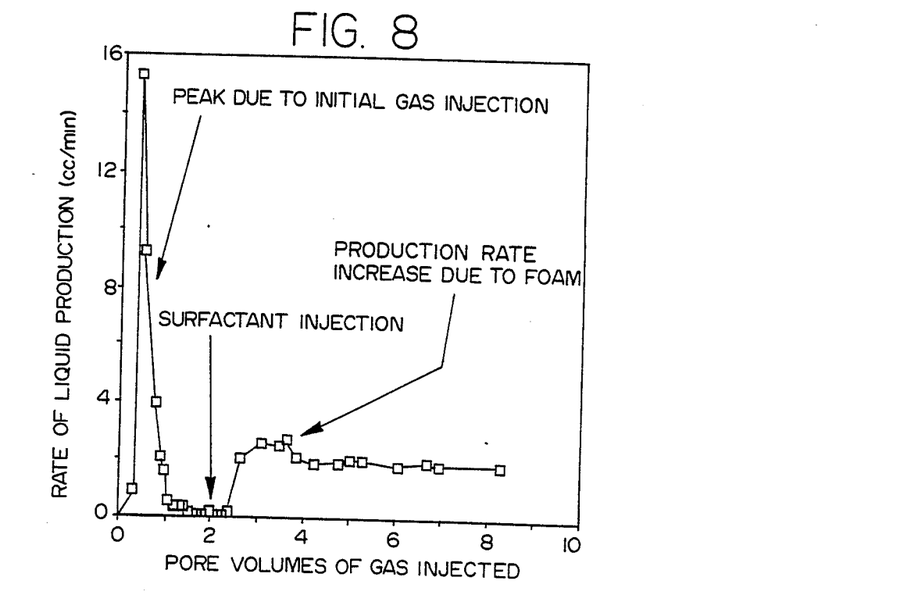
FIG. 8 represents graphically the rate of liquid production from a 2-D cell during coinjection of a surfactant and foam with a 1% Chaser solution.
Figure 11:
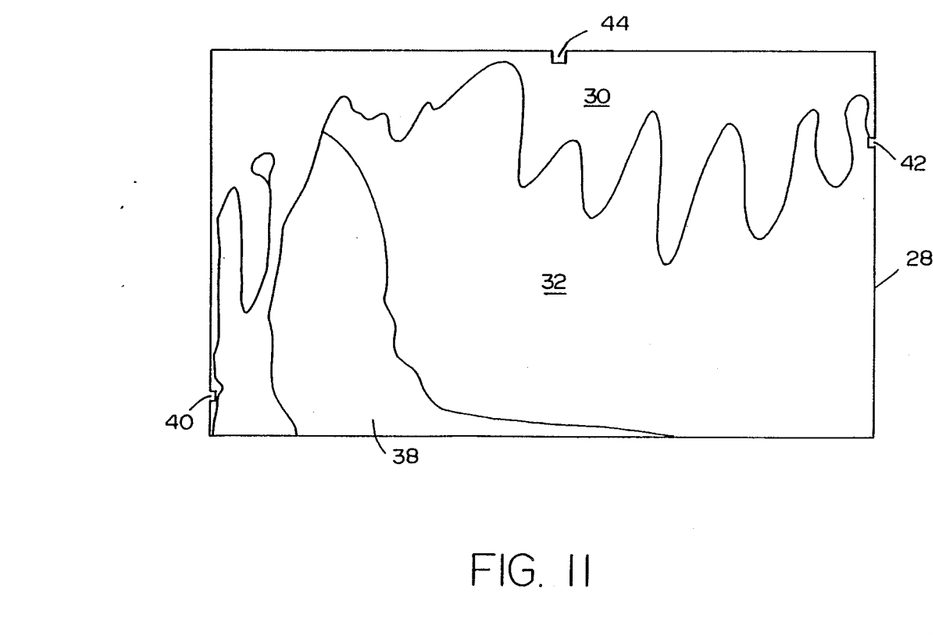
FIG. 11 depicts a representation of a 2-D plexiglas cell detailing the development of a gravity tongue underrun.
Figure 12:
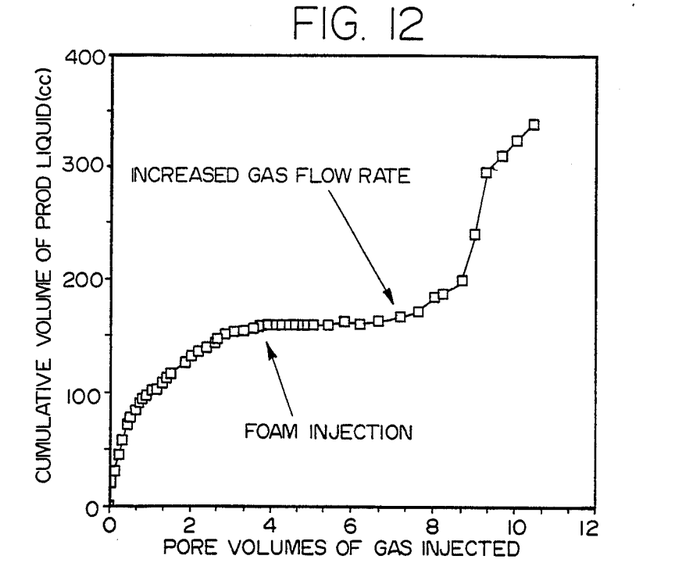
FIG. 12 is a graphical illustration of liquid production when foam is injected into the bottom of the 2-D model.

FIG. 11 shows the results of injecting a surfactant solution along with nitrogen gas to obtain additional production from unswept zone 32. As is shown in FIG. 11 the injected gas along with a portion of the surfactant solution rises into override zone 30. However, prior to closing off override zone 30, the surfactant solution forms a gravity tongue underrun 38 in reservoir 28. Thus, the surfactant solution does not seal off the override zone 30 as would be expected. Liquid production rates as a function of total gas injected is shown in FIG. 8. An early peak in the production rate is seen. This increase in the production rate is due to gas injection. The increase which is later shown is due to the in-situ formation of foam and resulting gas diversion.

EXPERIMENTAL CASE 2

Figure 9:
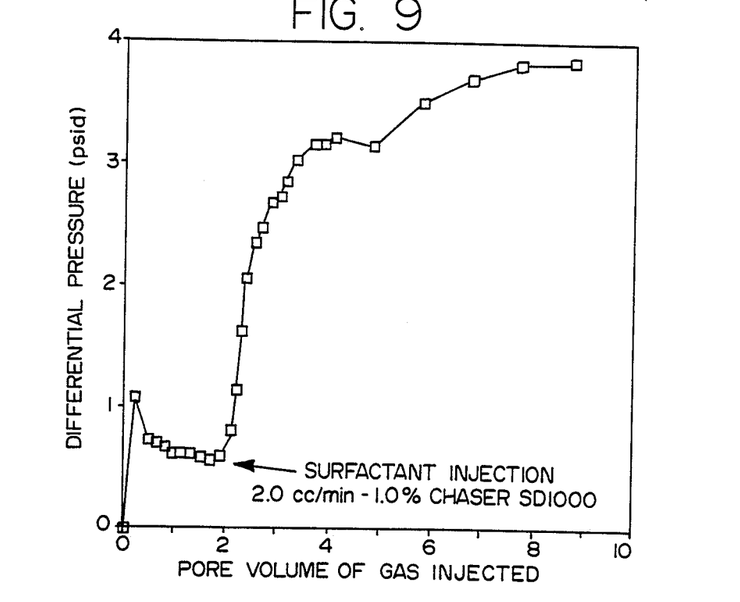
FIG. 9 is a graphical illustration which depicts differential pressure response during surfactant/gas coinjection.
Figure 10:
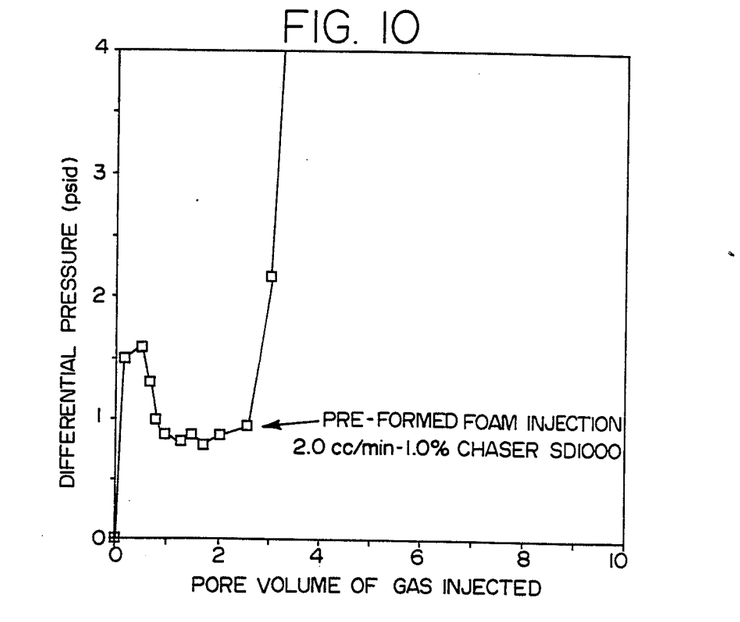
FIG. 10 depicts graphically differential pressure response during pre-formed foam injection.

Pre-formed foam is injected into injection port 40 where it proceeds into reservoir 28 into the bottom of the two-dimensional plexiglas model. A comparison of the pressure gradient across the two-dimensional cell is shown for cases 1 and 2. Representations for these cases are made in FIGS. 9 and 10. Based on the comparison of FIGS. 9 and 10 the pressure gradient for case 2 (FIG. 10) shows a much more rapid rise and a higher ultimate value than that for case 1 which is represented by FIG. 9. This comparison indicates the formation of either more foam or increased foam stability.

EXPERIMENTAL CASE 3

Figure 13:
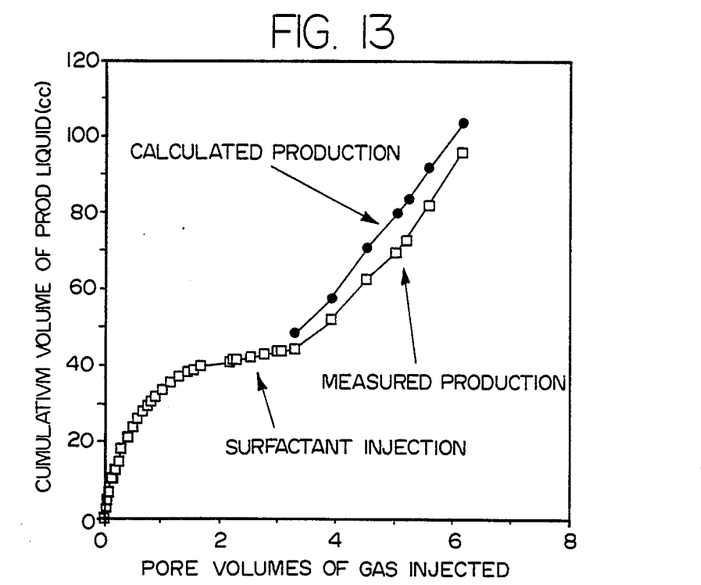
FIG. 13 is a graph which depicts liquid production during surfactant injection into the override zone.

Nitrogen gas and a surfactant were coinjected into center injection port 44 which appears in the middle top of the two-dimensional model reservoir 28 as shown in FIGS. 6 and 11. A foam was not formed due to the high gas saturation. No diversion was noted. The lack of improved cumulative production is shown in FIG. 13.

EXPERIMENTAL CASE 4

Figure 14:
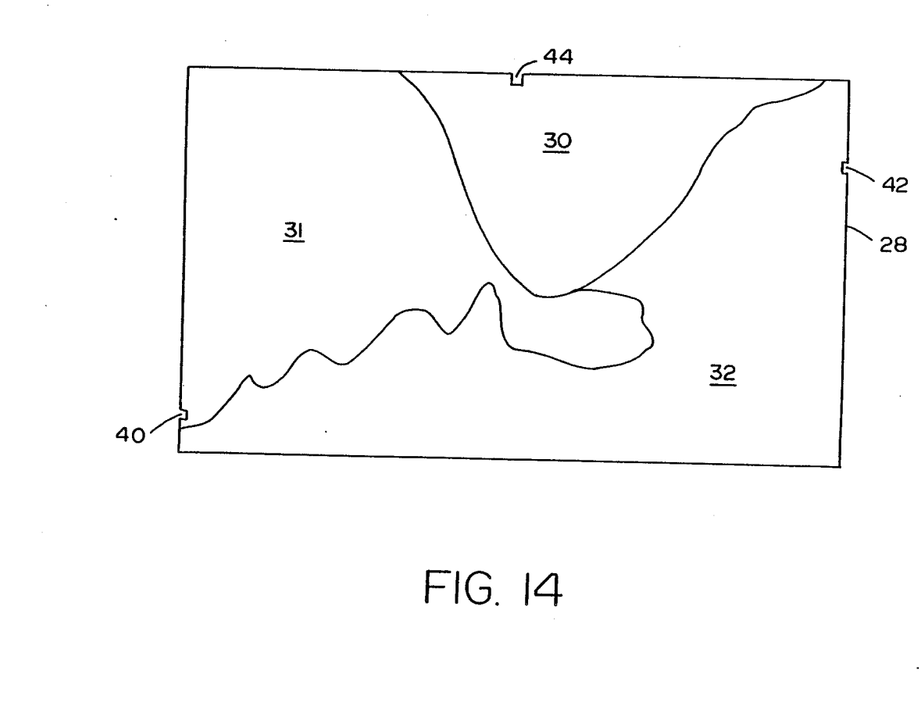
FIG. 14 is a representation of a 2-D plexiglas cell which demonstrates the effect of directing pre-formed foam directly into the override zone.
Figure 15:
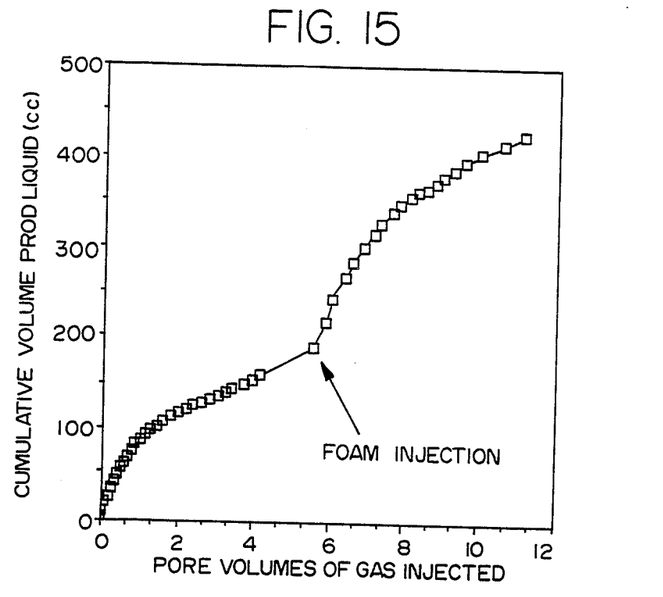
FIG. 15 is a graphical representation showing the volume of liquid produced when foam is injected into the gravity override zone.
Figure 16:
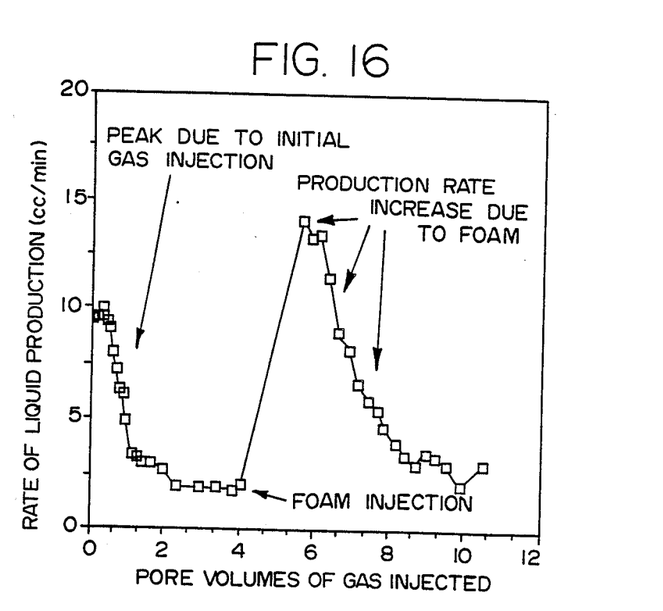
FIG. 16 illustrates graphically the rate of production response when foam is injected into the override zone.

While injecting nitrogen gas through injection port 40 into gas override zone 30, a pre-formed foam was injected into center injection port 44 of reservoir 28. As is shown in FIG. 14 a stable foam bank formed in override zone 30 and began moving downwardly toward unswept zone 32. A diverted, descending gas 31 is then shown to follow the foam bank downwardly, sweeping previously bypassed parts of reservoir 28. Thus, nitrogen gas 31 is diverted into unswept zone 32 where it removes hydrocarbonaceous liquids from the unswept zone. Foam utilization is clearly improved since no foam is lost to a gravity tongue underride. FIGS. 15 and 16 show the cumulative production history and the production rate of this demonstration. Foam injection directly into the gas override zone clearly results in increased overall hydrocarbonaceous liquid fluid recovery. Furthermore, FIG. 16 indicates that the large increase in production rate may occur when foam is injected directly into the override zone. Surfactant utilization in the foam is improved when pre-formed foam is injected into the top of the reservoir 28 since surfactant is not lost by gravity tongue underride which also reduces the formation of an emulsion of hydrocarbonaceous liquids.

Obviously, many other variations and modifications of this invention as previously set forth may be made without departing from the spirit and scope of this invention as those skilled in the art readily understand. Such variations and modifications are considered part of this invention and within the purview and scope of the appended claims.

I claim:

1. A method for injecting foam into a gravity override zone located within a hydrocarbonaceous fluid containing reservoir or formation comprising:
   (a) determining the existence of a gravity override zone;
   (b) injecting via a first injection well a drive fluid into a reservoir which fluid exits said reservoir via a production well; and
   (c) injecting a foamable composition via a second injection well located between said first injection well and the production well which composition is foamed in-situ thereby making a foam that proceeds into the top of said gravity override zone and blocks the override zone thereby diverting said drive fluid into an overridden zone.

2. The method as recited in claim 1 where after step (c) hydrocarbonaceous fluids are produced from said overridden zone.

3. The method as recited in claim 1 where said drive fluid is carbon dioxide or steam.

4. The method as recited in claim 1 where said second injection well is positioned substantially midway between said first injection well and the production well.

5. A method for diverting a drive fluid from a gravity override zone of a hydrocarbonaceous fluid containing reservoir or formation into an overridden zone which comprises:
   (a) injecting a drive fluid into said reservoir via a first injection well which penetrates said reservoir and which drive fluid exits said reservoir via a production well; and
   (b) injecting a foamable composition via a second injection well located between said first injection well and the production well which composition is foamed in-situ thereby making a foam that enters the top of said override zone so as to avoid forming a gravity tongue underride thereby blocking the override zone and diverting said drive fluid into said overridden zone.

6. The method as recited in claim 5 where after step (b) hydrocarbonaceous fluids are produced from said overridden zone.

7. The method as recited in claim 5 where said drive fluid is carbon dioxide or steam.

8. The method as recited in claim 5 where said second injection well is positioned substantially midway between said first injection well and the production well.

9. A method for diverting a drive fluid from a gravity override zone of a hydrocarbonaceous fluid containing reservoir or formation into an overridden zone which comprises:
   (a) injecting a steam or carbon dioxide drive fluid into said reservoir via a first injection well which penetrates said reservoir and which drive fluid exits said reservoir via said production well; and
   (b) injecting a foamable composition via a second injection well positioned substantially midway between said first injection well and the production well which composition is foamed in-situ thereby making a foam that enters the top of said override zone so as to avoid forming a gravity tongue underride thereby blocking the overridden zone and diverting said drive into said overridden zone.

10. The method as recited in claim 9 where after step (b) hydrocarbonaceous fluids are produced from said overridden zone.

11. The method as recited in claim 9 where said second injection well is contained in a concentric well pattern having at least two other injector wells and at least two other producer wells.

* * * * *